United States Patent [19]
Hosokawa

[11] Patent Number: 5,253,945
[45] Date of Patent: Oct. 19, 1993

[54] METAL CONNECTOR FOR BUILDING AND JOINTING STRUCTURE OF BUILDING USING THE SAME

[76] Inventor: Kiyoshi Hosokawa, 779 Sasagase-cho, Hamamatsu-shi, Shizuoka-ken, Japan

[21] Appl. No.: 815,143
[22] Filed: Dec. 31, 1991
[51] Int. Cl.⁵ .................................................. B23G 3/00
[52] U.S. Cl. ..................................... 403/258; 403/260; 403/407.1; 52/721
[58] Field of Search ................. 403/232.1, 256, 258, 403/260, 246, 245, 231, 407.1; 52/702, 703, 252

[56] References Cited

U.S. PATENT DOCUMENTS

| | | | |
|---|---|---|---|
| 1,775,572 | 9/1930 | Ross | 403/174 |
| 3,064,321 | 11/1962 | Rose | 403/231 |
| 4,040,694 | 8/1977 | Lascarrrou | 403/408.1 X |
| 4,558,968 | 12/1985 | Meickl | 403/174 |
| 4,981,388 | 1/1991 | Becken et al. | 403/258 |
| 5,061,111 | 10/1991 | Hosokawa | 403/232.1 |

FOREIGN PATENT DOCUMENTS

| | | |
|---|---|---|
| 658283 | 3/1938 | Fed. Rep. of Germany . |
| 3401303 | 7/1985 | Fed. Rep. of Germany . |
| 1423034 | 11/1964 | France . |
| 235142 | 2/1990 | Japan . |
| 157338 | 6/1990 | Japan . |
| 291911 | 3/1964 | Netherlands . |
| 442652 | 1/1968 | Switzerland . |

Primary Examiner—Randolph A. Reese
Assistant Examiner—George D. Spisich
Attorney, Agent, or Firm—Sughrue, Mion, Zinn Macpeak & Seas

[57] ABSTRACT

A metal connector and a jointing structure with which two members are jointed to each other with a sufficient fastening strength which can be grasped quantitatively. The metal connector comprises a metal connector body attached to a first one of the members and including a bottom plate and a core plate which has a window hole formed therein. A bolt is mounted on the core plate and extends into the window hole with a spacing left in the window hole. The other second member has a fitting recess formed therein in which the bottom plate and core plate of the metal connector body are received, and further has a working window hole formed therein. A nut is screwed on the bolt, and a holding plate is disposed in the spacing and the working window hole and presses, when the nut is turned to move on the bolt to press against the holding plate, against inner peripheries of the window hole and working window hole to force the first member to move toward the second member until a longitudinal end thereof is closely contacted with the second member.

16 Claims, 13 Drawing Sheets

METAL CONNECTOR FOR BUILDING AND JOINTING STRUCTURE OF BUILDING USING THE SAME

BACKGROUND OF THE INVENTION

1. Field of the Invention

This invention relates improvements in or relating to a metal connector for building and also to a jointing structure of a building using such a metal connector.

2. Description of the Prior Art

A wooden building normally includes a large number of jointing structures at which two lumber blocks or wooden members are jointed to each other. Such jointing structures may be a jointing structure between a column and a beam, a jointing structure between of beams extending in a serial direction or in perpendicular directions, a jointing structure between a column and a sill, a jointing structure at a principal rafter, that is, at tops of a pair of left and right diagonal members forming a triangle of a truss together with a beam, a jointing structure between an outer end portion of a diagonal member and a top end of a column, or the like.

Various means are conventionally employed to connect two lumber blocks to each other in those jointing structures, including notches, holes and so forth formed on lumber blocks, metal connectors such as nails, bolts and nuts, dowels and flange plates, and bonding agents, or any combination of those means. Such various conventional connecting means have been developed and are adopted to joint general lumber members, that is, solid members to each other, and it is admitted that they exhibit anticipated effects as such.

The conventional connecting means, however, are not always satisfactory for jointing structure in a large scale wooden building which draws much attention and is built recently, and wherein structural assemblies are employed for main structural parts, because they are not sufficient in binding strength or a metal connector is exposed to an outer side and presents a bad appearance.

Taking the above into consideration, the inventor has developed and proposed, in U.S. Pat. No. 5,061,111, a novel metal connector for a wooden building by which a jointing structure of any type (not only in a wooden building, which employs general lumber, but also in a large scale wooden building which employs structural assemblies) is provided with a satisfactory fastening strength without deteriorating the appearance as well as a novel jointing structure which makes use of such a metal connector.

The metal connector and the jointing structure disclosed in U.S. Pat. No. 5,061,111 are shown in FIGS. 20 and 21. Referring to FIGS. 20 and 21, the jointing structure shown is applied to connect a column and a beam to each other using the metal connector shown. The metal connector includes a metal connector body 1 which includes a rectangular bottom plate 2, a rectangular core plate 3 secured uprightly to an upper face of the bottom plate 2 along a center line, a mounting plate 4 secured uprightly to a longitudinal end of the bottom plate 2 and held in contact with and secured to an end face of the core plate 3, and a pair of wedge guide elements 5 and 6 mounted at symmetrical locations on the opposite faces of the core plate 3 adjacent the other longitudinal end remote from the mounting plate 4.

The metal connector is used to joint a column 7 and a beam 11 to each other. The column 7 has a recess 8 formed at a side face thereof at which it is to be jointed to the beam 12. The mounting plate 4 of the metal connector body 1 is fitted in the recess 8 of the column 7 and fastened to the column 7 by means of bolts 9 and nuts 10 to thereby rigidly secure the metal connector body 1 horizontally to the column 7.

The beam 11 has formed at an end portion thereof a fitting recess 12 which has a substantially similar profile as an outer profile of the metal connector body 1 except the mounting plate 4.

Thus, in assembling the beam 11 to the column 7, the beam 11 is operated so that the metal connector body 1 secured to the column 7 may be fitted into the fitting recess 12 of the beam 11 so that the beam 11 may be supported on the bottom plate 2 of the metal connector body 1.

Then, in this condition, the beam 11 is moved horizontally toward the column 7 so that a pair of wedge receiving recesses 13 and 14 may be opened forwardly of the wedge guide elements 5 and 6 received in a pair of widened portions of the fitting recess 12 of the beam 11, that is, on the side adjacent the column 7.

Then, a pair of wedge members 15 and 16 are driven into the thus open wedge receiving recesses 13 and 14, respectively, whereupon the entire beam 11 is gradually moved toward the column 7 by a wedging action of the wedge members 15 and 16. Finally, an end face of the beam 11 is contacted closely with the opposing side face of the column 7, thereby establishing a required secured condition between the column 7 and the beam 11.

By the way, a necessary and sufficient fastening strength between a column and a beam in such jointing structure as described above is derived from a suitable degree (or depth) of driving of wedge members, and such fastening strength must not be insufficient nor excessive. However, it is a problem that such fastening strength is only qualitatively determinable

SUMMARY OF THE INVENTION

It is an object of the present invention to provide a metal connector and a jointing structure with which two members are jointed to each other with a sufficient fastening strength which can be grasped quantitatively.

In order to attain the object, according to one aspect of the present invention, there is provided a metal connector for jointing first and second members of a building to each other, which comprises a metal connector body including a bottom plate and a core plate secured vertically to an upper face of the bottom plate and having a window hole formed therein, a bolt mounted at a base end portion thereof at an inner periphery of the core plate around the window hole such that the other free end portion thereof extends into the window hole with a spacing left between the free end thereof and an opposing portion of the inner periphery around the window hole, the metal connector body being connected, at a longitudinal end thereof remote from the bolt with respect to the window hole, to the second member, the first member having a fitting recess formed at a jointing end portion thereof in a profile suitable to closely receive the bottom plate and core plate of the metal connector body therein, the first member further having a working window hole formed contiguously to the fitting recess therein, a nut screwed on the bolt, and a holding plate disposed in the spacing and the working window hole transversely to the window hole of the metal connector body for pressing, when the nut is turned in a predetermined direction to axially move on the bolt to press against the holding plate, against the inner periphery of the metal connector body around the window hole to force the first member to move toward the second member until a longitudinal end of the first member is closely contacted with the second member.

The metal connector is thus simple in construction in that it comprises the metal connector body, bolt, nut and holding plate. Accordingly, it can be produced readily, and a jointing operation with the metal connector can be performed readily. Further, with the metal connector, the first and second members are jointed to each other by turning the nut in the predetermined direction, and the jointing strength between the first and second members can be grasped quantitatively. Consequently, the jointing strength can be adjusted suitably by adjusting the turning motion of the nut, and management and so forth of a building can be performed reasonably.

According to another aspect of the present invention, there is provided a metal connector for jointing first and second members of a building to each other, which comprises a metal connector body including a bottom plate and a core plate secured vertically to an upper face of the bottom plate and having a pair of window holes formed at symmetrical locations adjacent the opposite longitudinal ends therein with respect to the center in the longitudinal direction thereof, a pair of bolts mounted at base end portions thereof at inner peripheries of the core plate around the window holes such that the other free end portions thereof extend into the window holes with spacings left between the free ends thereof and opposing portions of the inner peripheries around the window holes, each of the first and second members having a fitting recess formed at a jointing end portion thereof in a profile suitable to closely receive corresponding longitudinal halves of the bottom plate and core plate of the metal connector body therein, each of the first and second members further having a working window hole formed contiguously to the fitting recess therein, a pair of nuts screwed on the bolts, and a pair of holding plates disposed in the spacings and the working window holes transversely to the window holes of the metal connector body for pressing, when the nuts are turned in a predetermined direction to axially move on the bolts to press against the holding plates, against the inner peripheries of the metal connector body around the window holes to force the first and second members to move toward each other until longitudinal ends of the first and second members are closely contacted with each other.

The metal connector is thus simple in construction in that it comprises the metal connector body, bolt, nut and holding plate. Further, with the metal connector, the first and second members are jointed in an end-to-end serial relationship to each other by turning the nuts in the predetermined direction, and the jointing strength between the first and second members can be grasped quantitatively. Consequently, the jointing strength can be adjusted suitably by adjusting the turning motion of the nuts, and management and so forth of a building can be performed reasonably.

According to a further aspect of the present invention, there is provided a jointing structure for a building, which comprises a metal connector body including a bottom plate and a core plate secured vertically to an upper face of the bottom plate and having a window hole formed therein, first and second members to be jointed to each other by means of the metal connector body, a bolt mounted at a base end portion thereof at an inner periphery of the core plate around the window hole such that the other free end portion thereof extends into the window hole with a spacing left between the free end thereof and an opposing portion of the inner periphery around the window hole, means for connecting a longitudinal end of the metal connector body remote from the bolt with respect to the window hole to the second member, the first member having a fitting recess formed at a jointing end portion thereof in a profile suitable to closely receive the bottom plate and core plate of the metal connector body therein, the first member further having a working window hole formed contiguously to the fitting recess therein, a nut screwed on the bolt, and a holding plate disposed in the spacing and the working window hole transversely to the window hole of the metal connector body for pressing, when the nut is turned in a predetermined direction to axially move on the bolt to press against the holding plate, against the inner periphery of the metal connector body around the window hole to force the first member to move toward the second member until a longitudinal end of the first member is closely contacted with the second member.

With the jointing structure, the first and second members are jointed to each other by turning the nut in the predetermined direction, and the jointing strength between the first and second members can be grasped quantitatively. Consequently, the jointing strength can be adjusted suitably by adjusting the turning motion of the nut, and management and so forth of a building can be performed reasonably. Accordingly, with the jointing structure, even an operator who is not skilled in the art can operate to obtain a suitable fastening strength between different members not only in a wooden building which employs general lumber but also in a large scale wooden building which employs structural assemblies as well as in a building of steel structure.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
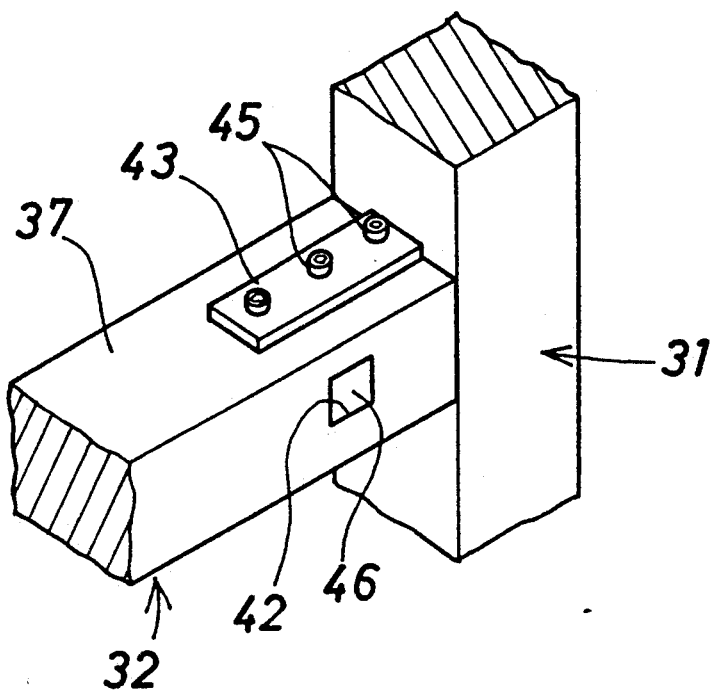
FIG. 1 is a perspective view of a metal connector and a jointing structure between a column and a beam using the metal connector showing a first preferred embodiment of the present invention.
Figure 2:
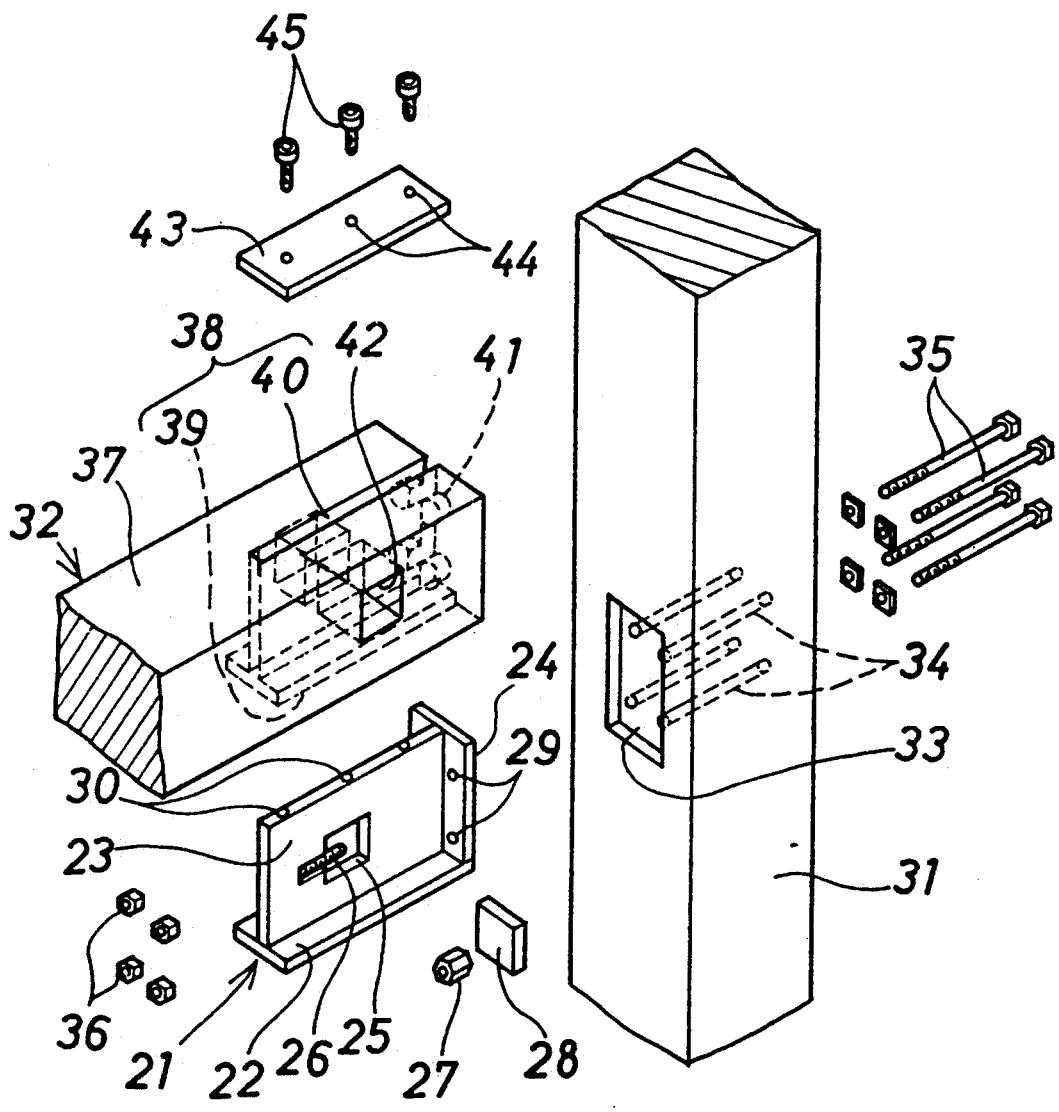
FIG. 2 is a fragmentary perspective view of the metal connector and jointing structure of FIG. 1.

Referring first to FIGS. 1 and 2, there are shown a metal connector and a jointing structure between a column and a beam using the metal connector according to a first preferred embodiment of the present invention. The metal connector shown includes a metal connector body 21 which includes a rectangular bottom plate 22, a rectangular core plate 23 secured uprightly to an upper face of the bottom plate 22 along a center line, and a mounting plate 24 secured uprightly to a longitudinal end of the bottom plate 22 and held in contact with and secured to an end face of the core plate 23.

The mounting plate 24 has a width equal to the width of the bottom plate 22 and has a height equal to the height of the core plate 23.

The core plate 23 has a rectangular window hole 25 perforated therein. A bolt 26 is embedded at a base end half thereof in a portion of the core plate 23 around the window hole 25 such that the other end half thereof extends into the window hole 25 toward the mounting plate 24 with a sufficient spacing left between the other end thereof and an opposing side of an inner periphery of the window hole 25 to allow a nut 27 and a holding plate 28 to be disposed therein.

The mounting plate 24 has four bolt insertion holes 29 formed in two columns therein on the opposite sides of the core plate 23. Meanwhile, the core plate 23 has three threaded holes 30 formed in a predetermined spaced relationship on an upper end face thereof.

The metal connector body 21 can be produced readily either by individually preparing the bottom plate 22, core plate 23 and mounting plate 24 and assembling them by suitable means such as welding or fastening screws or by molding or casting them as a unitary member.

The metal connector is used to joint a column 31 and a beam 32 to each other.

The column 31 has a recess 33 formed at a side face thereof at which it is to be jointed to the beam 32. The recess 33 has a sufficient size to receive therein the mounting plate 24 and the end portion of the bottom plate 22 on which the mounting plate 24 is mounted.

The column 31 has four bolt insertion holes 34 perforated therein in an aligned relationship to the bolt insertion holes 29 of the mounting plate 24. The bolt insertion holes 34 extend from the bottom of the recess 33 to the opposite side face of the column 31.

Figure 3:
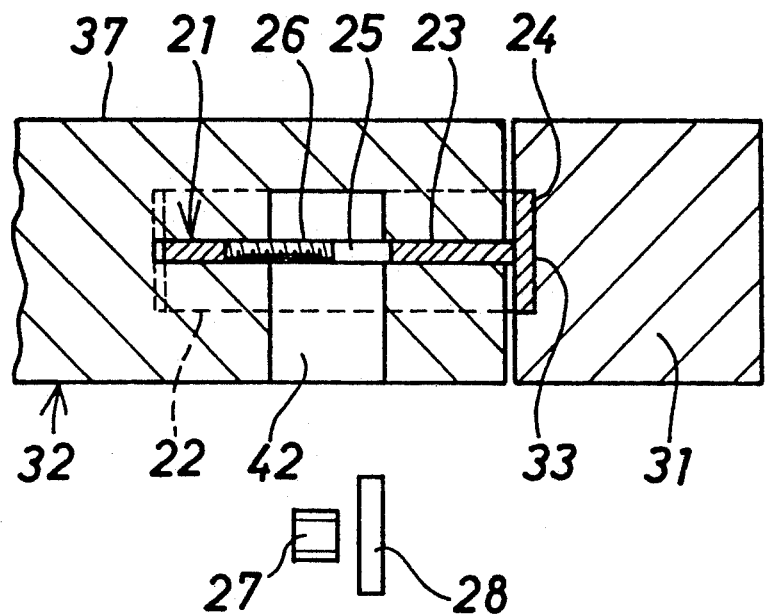
FIGS. 3 and 4 are sectional views showing the jointing structure of FIG. 1 at different stages in assembling.

The metal connector body 21 is attached to the column 31 in the following manner. In particular, the mounting plate 24 of the metal connector body 21 and the end of the bottom plate 22 at which the mounting plate 24 is received are first fitted into the recess 33 of the column 31, and then fastening bolts 35 are inserted into the bolt insertion holes 34 from the openings on the opposite side face of the column 31 until threaded end portions thereof are projected from the bolt insertion holes 29 of the mounting plate 24. Then, fastening nuts 36 are screwed onto and tightened to the thus projected threaded end portions of the fastening bolts 35 to secure the metal connector body 21 horizontally to the column 31 as seen in FIG. 3.

The beam 32 is jointed at a jointing end portion 37 thereof to the column 31 by means of the metal connector body 21. In particular, referring to FIG. 2, the jointing end portion 37 of the beam 32 has a fitting recess 38 formed therein which has a substantially same profile as that of the metal connector body 21 except the mounting plate 24 and the end of the bottom plate 22 at which the mounting plate 24 is received. The fitting recess 38 is thus composed of a horizontal groove 39 formed in the jointing end portion 37 of the beam 32 and having a suitable size and shape to receive the core plate 23 of the metal connector body 21 therein, and a vertical slot 40 formed along the center line in the jointing end portion 37 perpendicularly and contiguously to the horizontal groove 39 and having a suitable size and shape to receive the core plate 23 of the metal connector body 21 therein. The horizontal groove 39 is opened to the bottom face and an outer end face of the jointing end portion 37 of the beam 32 while the vertical slot 40 is opened to the top face, bottom face and outer end face of the jointing end portion 37.

Two pairs of depressions 41 are formed on the longitudinal end face of the jointing end portion 37 of the beam 32 for receiving therein the fastening nuts 36 screwed on the end portions of the fastening bolts 35 projected from the bottom of the recess 33 of the column 31.

A working window hole 42 is formed in the jointing end portion 37 of the beam 32 transversely to the vertical slot 40. The working window hole 42 extends horizontally and is opened to the vertical slot 40 and an outer side face of the jointing end portion 37 of the beam 32. However, the working window hole 42 may otherwise be perforated transversely through the jointing end portion 37 of the beam 32 such that it is opened to the opposite outer side faces of the jointing end portion 37.

The beam 32 is jointed to the column 31 in the following manner.

First, the jointing end portion 37 of the beam 32 is placed from above onto the bottom plate 22 of the metal connector body 21 assembled to the column 31 such that the metal connector body 21 is received into the fitting recess 38 and the fastening nuts 36 are opposed to the depressions 41. In the thus placed position of the jointing end portion 37 of the beam 32, the top face of the beam 32, that is, the top face of the jointing end portion 37, and the top face of the metal connector body 21, or more particularly the top face of the core plate 23, are aligned with each other.

Subsequently, the entire beam 32 is moved axially toward the column 31 until the working window hole 42 thereof is substantially aligned with the window hole 25 in the core plate 23 of the metal connector body 21 as seen in FIG. 3 and the longitudinal end face of the jointing end portion 37 thereof comes very close to the bottom face of the recess 33 of the column 31.

Figure 4:
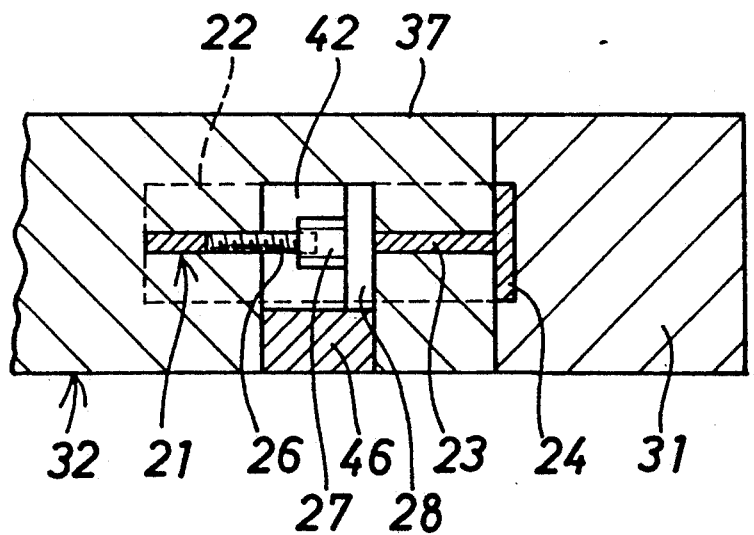

Then, the nut 27 is fitted onto the bolt 26 of the metal connector body 21 in the working window hole 42 and the window hole 25 and then screwed toward the base end side of the bolt 26, and then the holding plate 28 is inserted into the window hole 25 through the working window hole 42. Then, the nut 27 is screwed now in the reverse direction to move away from the base end of the bolt 26 so that it is pressed tightly against the holding plate 28. Thereupon, the holding plate 28 is tightly pressed against the opposing end face of the inner periphery of the window hole 25 and an adjacent end face of an inner periphery of the working window hole 42 of the beam 32. Consequently, the entire beam 32 is forced by way of the holding plate 28 to gradually move toward the column 31 until the longitudinal or outer end face of the jointing end portion 37 thereof is closely contacted with the opposing side face of the column 31 as seen in FIG. 4.

In this instance, a pressing or fastening strength between the column 31 and the beam 32 can apparently be grasped quantitatively from an amount of movement of the nut 27 on the bolt 26, that is, an amount of turning motion of the nut 27.

Finally, a cover plate 43 is placed onto the top face of the jointing end portion 37 of the beam 32 as seen in FIG. 1, and screws 45 are inserted into perforations 44 formed in the cover plate 27 and are screwed tightly into the threaded holes 30 at the top end of the core plate 23 as seen in FIG. 1.

It is to be noted that a packing plate 46 made of a same material as the beam 32 may additionally be inserted into the working window hole 42 of the beam 32 to fill up the working window hole 42.

While the jointing structure described above with reference to FIGS. 1 to 4 employs only one such metal connector as described above and joints a single column and a single beam to each other, a column to beam jointing structure may otherwise joint two, three or four beams in different directions to a column. In any case, each beam can be jointed to a column using such metal connector as described above. However, attention must be paid so that fastening bolts may not interfere with each other in the column.

Figure 5:
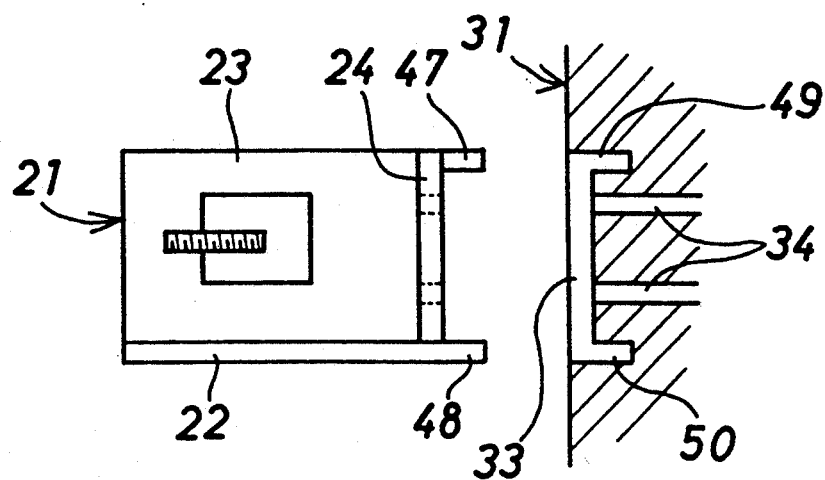
FIG. 5 is a side elevational sectional view showing a modification to a metal connector body of the metal connector shown in FIG. 1.
Figure 6:
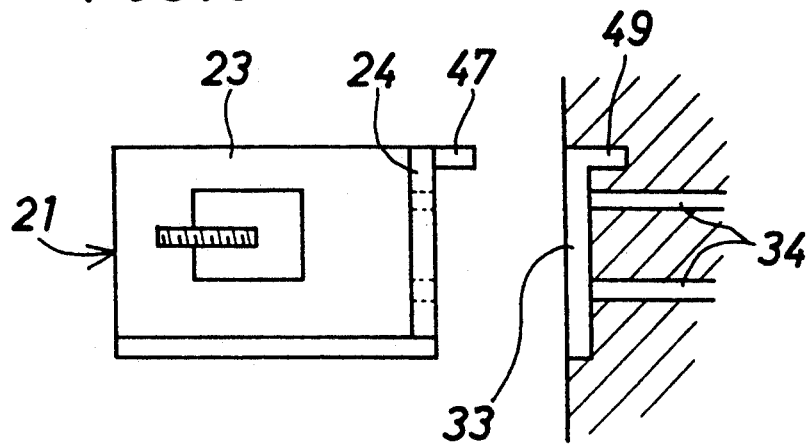
FIG. 6 is a similar view but showing another modification to the metal connector body shown in FIG. 1.
Figure 7:
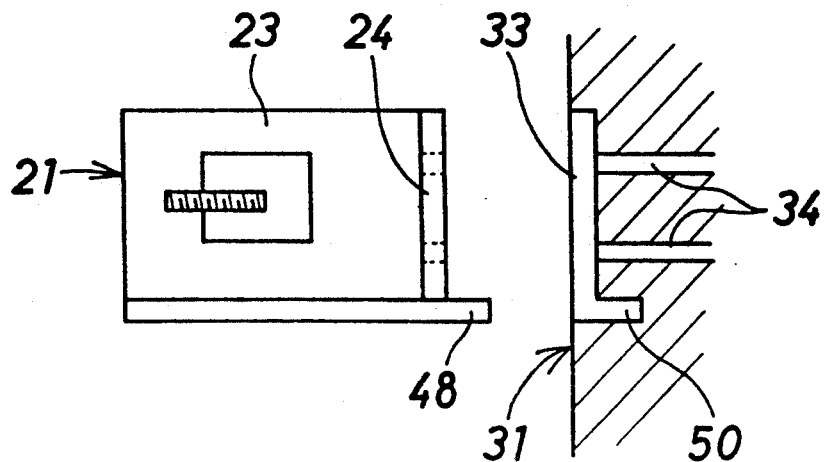
FIG. 7 is a similar view but showing a further modification to the metal connector body shown in FIG. 1.

FIGS. 5 to 7 show three different modifications to the metal connector body 21 shown in FIGS. 1 to 4.

The modified metal connector body shown in FIG. 5 is denoted also at 21 and constructed such that it has a pair of upper and lower flanges 47 and 48. The upper flange 47 extends laterally from an upper end of the mounting plate 24 while the lower flange 48 is formed as a longitudinal extension of the bottom plate 22 and extends in parallel to the upper flange 47. Thus, a column 31 to which the modified metal connector body 21 is to be assembled has a pair of flange receiving grooves 49 and 50 formed at upper and lower ends of the recess 33 such that they may receive the upper and lower flanges 47 and 48 of the metal connector body 21, respectively.

Meanwhile, the modified metal connector body 21 shown in FIG. 6 is a modification also to the modified metal connector body 21 shown in FIG. 5 in that it only has the upper flange 47 on the mounting plate 24 thereof. Thus, a column 31 for use with the present modified metal connector 21 may only have the upper flange receiving groove 49 at the top end of the recess 33.

On the other hand, the modified connector body 21 shown in FIG. 7 is another modification to the modified metal connector body 21 shown in FIG. 5 in that it only has the lower flange 48 on the mounting plate 24. Thus, a column 31 for use with the present modified metal connector 21 may only have the lower flange receiving groove 50 at the bottom end of the recess 33.

Since any of the modified metal connector bodies 21 shown in FIGS. 5 to 7 is constructed such that the upper flange 47 and/or lower flange 48 are received in the corresponding flange receiving groove 47 and/or groove 48, the coupling strength between the metal connector body 21 and the column 31 is improved, and accordingly, the strength in supporting the beam 32 on the column 31 is increased.

Figure 8:
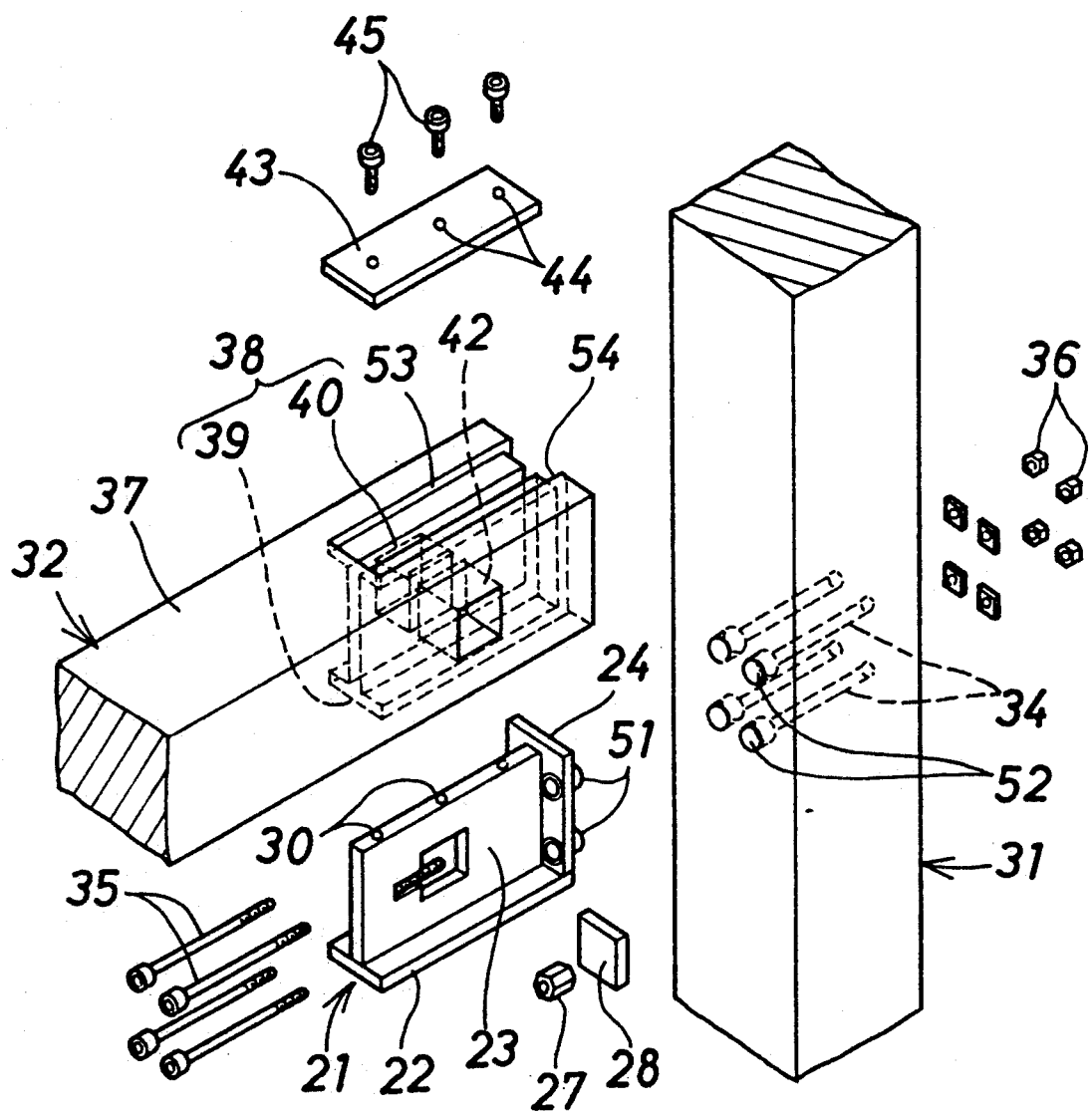
FIG. 8 is a fragmentary perspective view of a metal connector and a jointing structure between a column and a beam using the metal connector showing a second preferred embodiment of the present invention.

Referring now to FIG. 8, there are shown a metal connector and a jointing structure between a column and a beam using the metal connector according to a second preferred embodiment of the present invention. The metal connector and the jointing structure are a modification to the metal connector and the jointing structure shown in FIGS. 1 to 4, respectively, and since they have somewhat common construction, only differences of the former from the latter will be described below.

The mounting plate 24 of the connector metal body 21 has two pairs of bolt head receiving tubes or hubs 51 formed in a predetermined spaced relationship on and extending outwardly from an outer face thereof. Meanwhile, the core plate 23 has a height a little smaller than the height of the mounting plate 24.

Thus, a column 31 for use with the metal connector body 21 has two pairs of depressions 52 formed in a predetermined relationship on a side face thereof for receiving therein the bolt head receiving tubes 51 of the mounting plate 24 of the metal connector body 21. The depressions 52 are formed contiguously to and concentrically with the bolt insertion holes 34 formed in the column 31.

Meanwhile, a beam 32 for use with the metal connector body 21 has a shallow groove 53 formed on the top face of the jointing end portion 37 thereof for receiving the cover plate 43 therein. Further, the beam 32 has another shallow groove 54 formed on the outer longitudinal end of the jointing end portion 37 thereof for receiving the mounting plate 24 therein.

The metal connector body 21 in the present embodiment is assembled to the column 31 in the following manner. In particular, the metal connector body 21 is operated to insert the bolt head receiving tubes 51 on the mounting plate 24 thereof until the mounting plate 24 is contacted with the opposing side face of the column 21. Then, the fastening bolts 35 are individually inserted into the bolt insertion holes 34 through round holes formed in the bolt head receiving tubes 51, and then the nuts 36 are screwed tightly onto ends of the fastening bolts 35 which are projected outwardly from the opposite side face of the column 31, thereby to secure the metal connector body 21 to the column 32.

Figure 9:
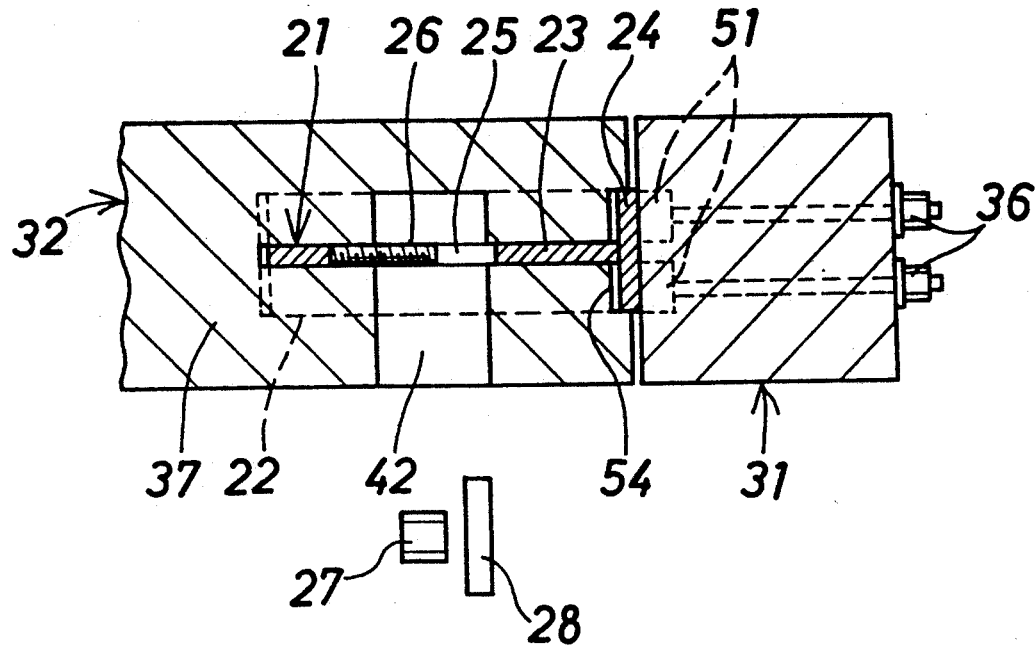
FIGS. 9 to 11 are sectional views illustrating the jointing structure of FIG. 8 at different stages in assembling.

The beam 32 is assembled in the following manner. First, the beam 32 is operated so that the core plate 23 and the bottom plate 22 of the metal connector body 21 may be fitted into the vertical slot 40 and the horizontal groove 39, respectively, of the fitting recess 38 of the jointing end portion 37 of the beam 32. In this condition, the groove 54 in the jointing end portion 37 of the beam 32 is horizontally aligned with the mounting plate 24 of the metal connector body 21 on the column 31. Then, the entire beam 32 is moved horizontally axially toward the column 31, whereupon the mounting plate 24 is fitted into the groove 54 as seen in FIG. 9.

Figure 10:
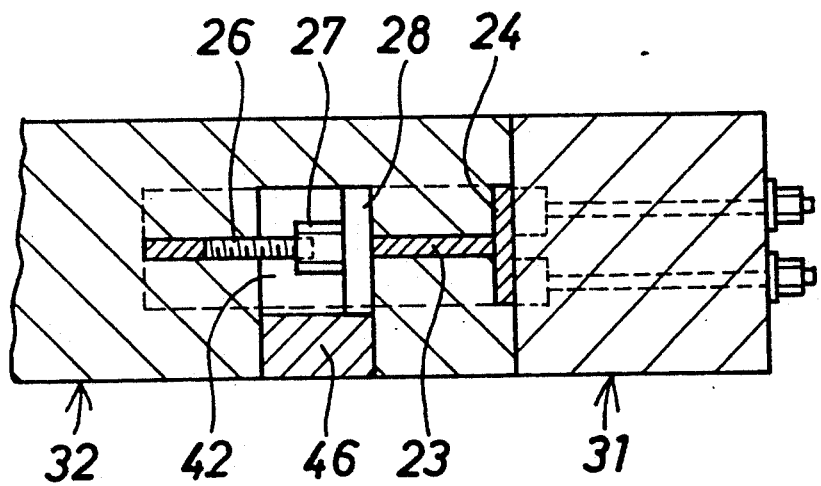

Then, the nut 27 and the holding plate 28 are operated in a similar manner as in the first embodiment described hereinabove in the working window hole 42 of the beam 32 and the window hole 25 of the metal connector body 21 so that the holding plate 28 may be pressed by the nut 27 to gradually move the entire beam 32 toward the beam 31 until the longitudinal or outer end face of the jointing end portion 37 thereof is securely pressed against the opposing side face of the column 31 as seen in FIG. 10.

Figure 11:
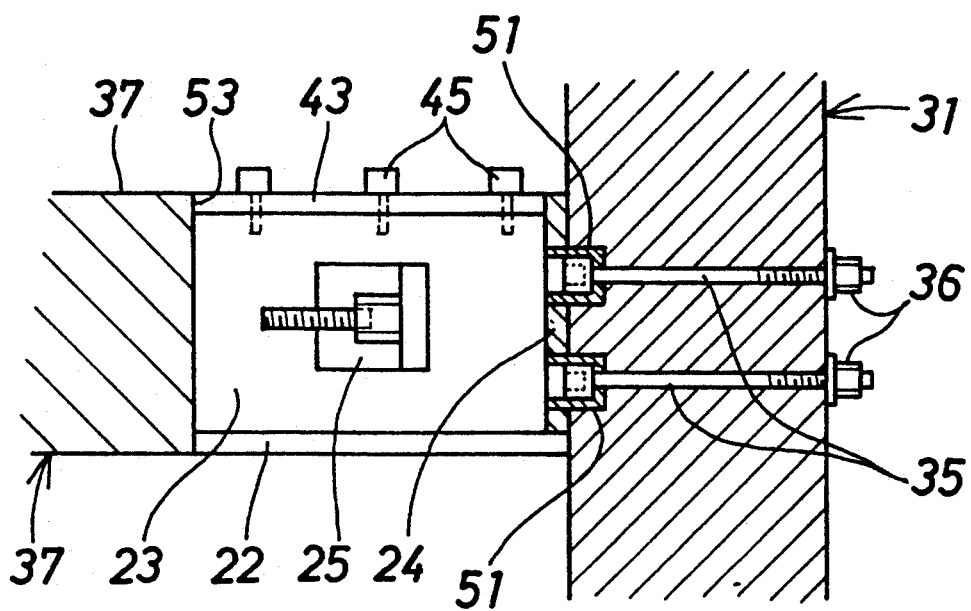

Finally, the cover plate 43 is fitted into and placed onto the bottom of the shallow groove 53 of the beam 32, and then the screws 45 are inserted into the perforations 44 in the cover plate 43 and screwed tightly into the threaded holes 30 at the top end face of the core plate 23 to secure the cover plate 43 to the beam 32 as seen in FIG. 11.

Figure 12:
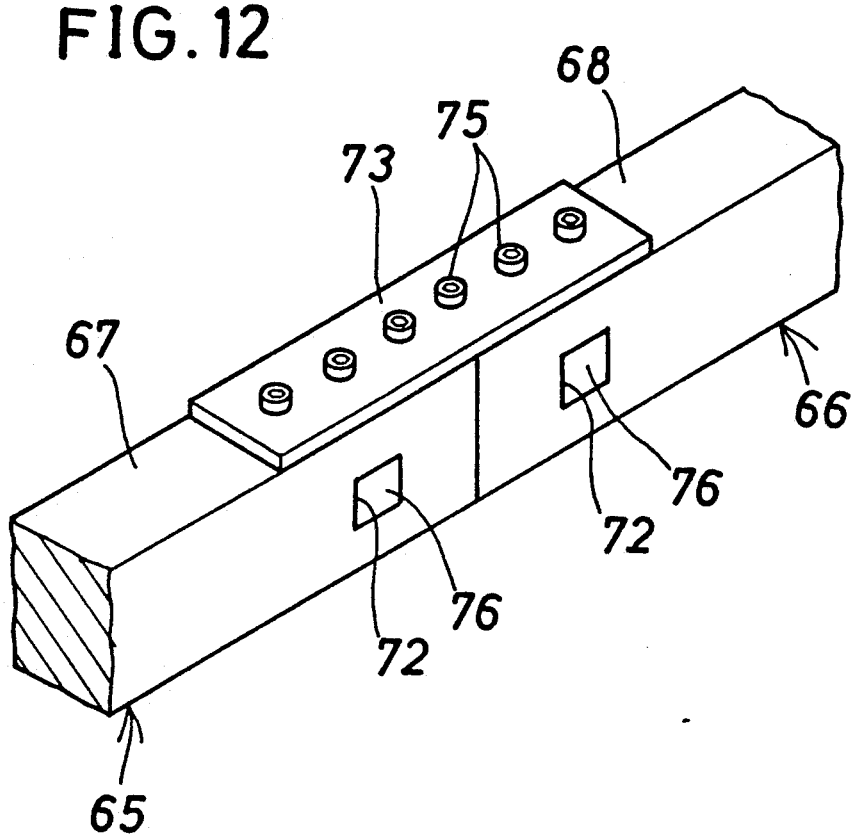
FIG. 12 is a perspective view of a metal connector and a jointing structure between a pair of beams in a series direction using the metal connector showing a third preferred embodiment of the present invention.
Figure 13:
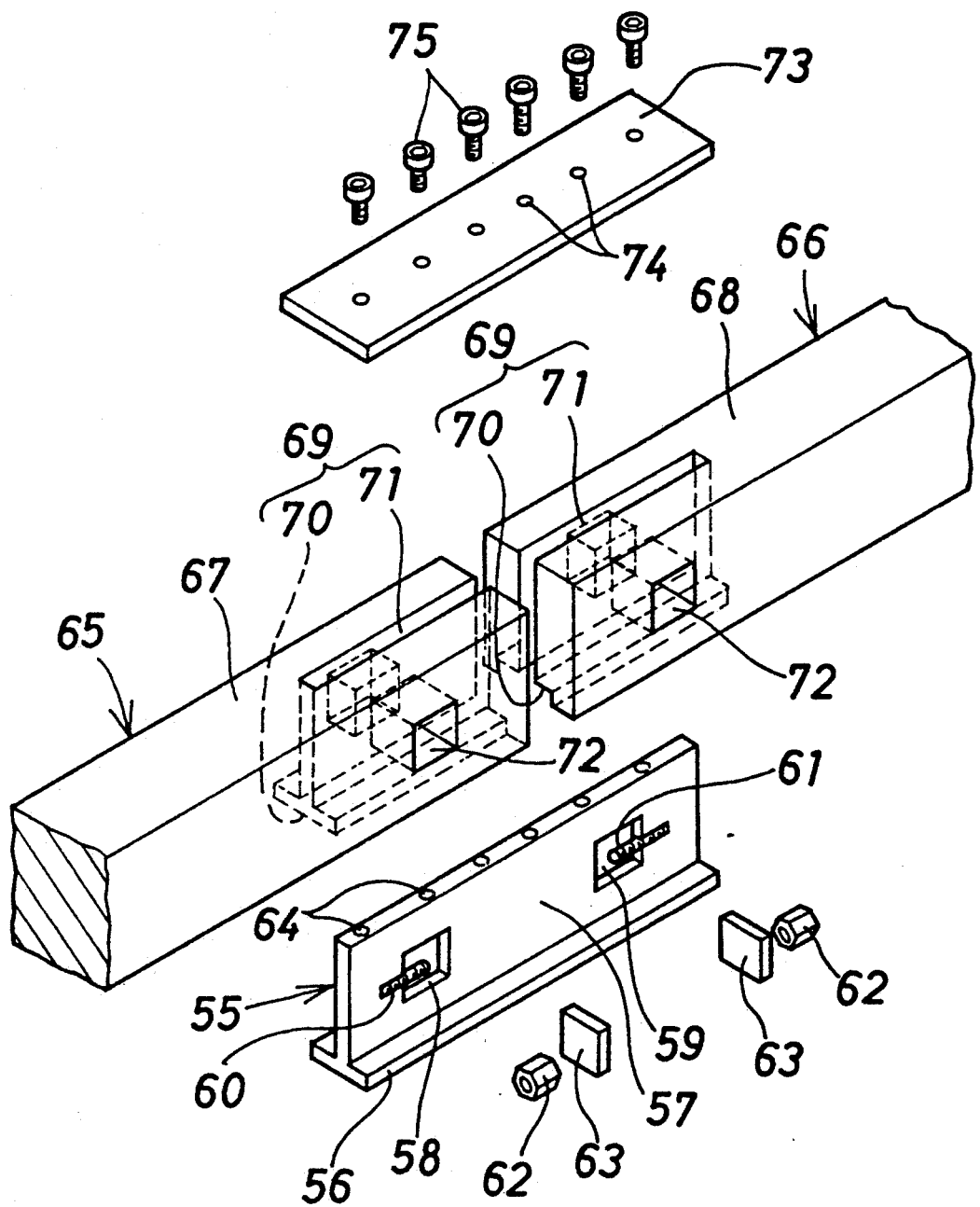
FIG. 13 is a fragmentary perspective view of the metal connector and the jointing structure shown in FIG. 12.

Referring now to FIGS. 12 and 13, there are shown a metal connector and a jointing structure between two beams in a serial direction using the metal connector according to a third preferred embodiment of the present invention. The metal connector of the present embodiment includes a metal connector body 55 which includes a rectangular bottom plate 56 and a rectangular core plate 57 secured uprightly to an upper face of the bottom plate 56 along a center line.

The core plate 57 has a pair of rectangular window holes 58 and 59 formed therein adjacent the opposite longitudinal ends. A pair of bolts 60 and 61 are embedded at base end halves thereof in portions of the core plate 57 around the window holes 58 and 59 such that the other end halves thereof extend inwardly into the window holes 58 and 59, respectively, toward the longitudinal center of the core plate 57 with sufficient spacings left between the other ends thereof and opposing sides of inner peripheries of the window holes 58 and 59 to allow nuts 27 and holding plates 28 to be disposed therein.

Several threaded holes 64 are formed in a predetermined spaced relationship at an upper end face of the core plate 57.

Similarly as in the case of the metal connector body 21 in the first embodiment described hereinabove, the metal connector body 55 can be produced readily either by individually preparing the bottom plate 56 and core plate 57 and assembling them by suitable means such as welding or fastening screws or by molding or casting them as a unitary member.

The metal connector is used to joint a pair of beams 65 and 66 to each other along a straight line.

The beams 65 and 66 are jointed at jointing end portions 67 and 68 thereof to each other by means of the metal connector body 55. In particular, referring to FIG. 13, the jointing end portions 67 and 68 of the beams 65 and 66 have a pair of fitting recesses 69 formed therein which generally have a substantially similar profile as that of the metal connector body 55. Each of the fitting recesses 69 is thus composed of a flattened horizontal groove 70 formed at the bottom of the jointing end portion 67 or 68 of the beam 65 or 66 and having a suitable size and shape to accept a longitudinal half of the bottom plate 56 of the metal connector body 55 therein, and a vertical slot 71 formed along the center line in the jointing end portion 67 or 68 and having a suitable size and shape to receive a longitudinal half of the core plate 57 therein. The horizontal groove 70 is opened to the bottom face and an outer end face of the jointing end portion 67 or 68 of the beam 65 or 66 while the vertical slot 71 is opened to the top face, bottom face and outer end face of the jointing end portion 67 or 68.

A working window hole 72 is formed in each of the jointing end portions 67 and 68 of the beams 65 and 66 transversely to the vertical groove 71. The working window hole 72 extends horizontally and is opened to the vertical groove 71 and an outer side face of the jointing end portion 67 or 68 of the beam 65 or 66. However, the working window hole 42 may otherwise be perforated transversely through the jointing end portion 67 or 68 of the beam 65 or 66 such that it is opened to the opposite outer side faces of the jointing end portion 67 or 68.

The beams 65 and 66 are jointed to each other in the following manner.

Figure 14:
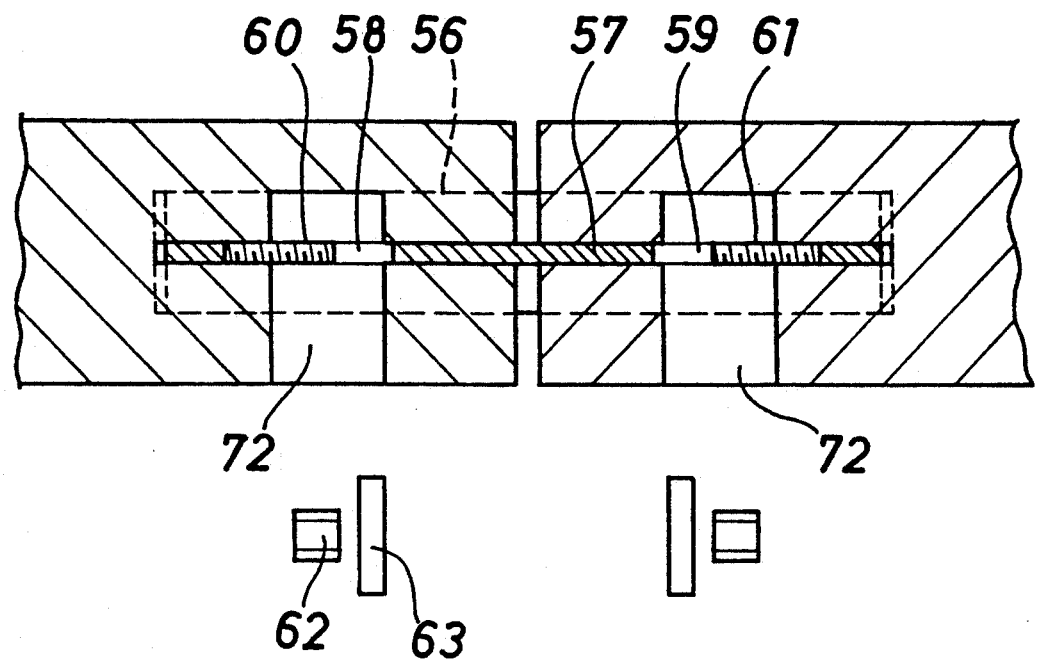
FIGS. 14 and 15 are sectional views illustrating the jointing structure of FIG. 12 at different stages in assembling.

First, the jointing end portions 67 and 68 of the beams 65 and 66 are placed from above onto the bottom plate 56 of the metal connector body 55 such that the metal connector body 55 is received into the fitting recesses 69 with a small gap left between opposing longitudinal end faces of the jointing end portions 67 and 68. In the thus placed positions of the jointing end portions 67 and 68 of the beams 65 and 66, the top faces of the jointing end portions 67 and 68, that is, the top faces of the beams 65 and 66, and the top face of the metal connector body 55, or more particularly the top face of the core plate 57, are aligned with each other as seen in FIG. 14.

Figure 15:
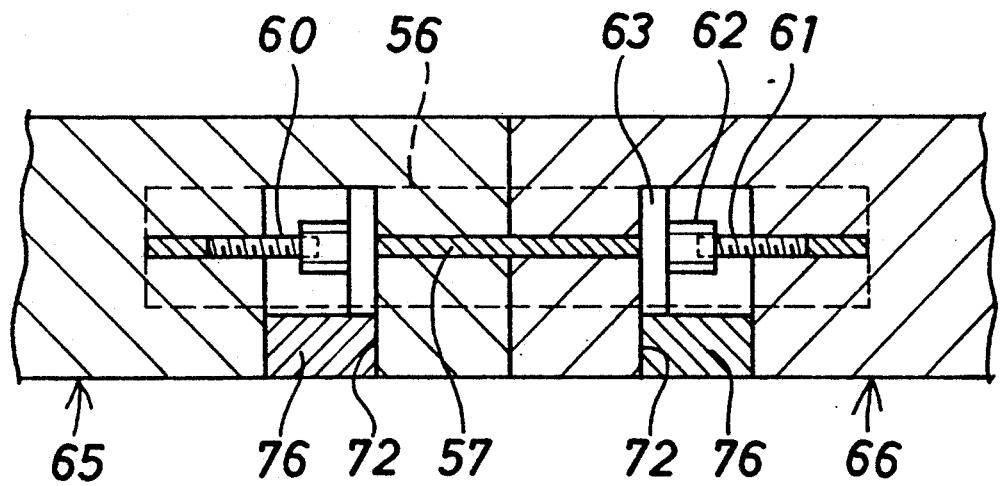

Then, the nuts 62 are fitted onto the bolts 60 and 61 of the metal connector body 55 in the working window holes 72 and the window holes 58 and 59 and then screwed toward the base end sides of the bolts 60 and 61, and then the holding plates 63 are inserted into the window holes 58 and 59 through the working window holes 72. Then, the nuts 62 are screwed now in the individually reverse directions to move away from the base ends of the bolts 60 and 61 so that they are pressed tightly against the holding plates 63. Thereupon, the holding plates 63 are tightly pressed against the opposing end faces of the inner peripheries of the window holes 58 and 59 and adjacent end faces of inner peripheries of the working window holes 72 of the beams 65 and 66. Consequently, the entire beams 65 and 66 are forced by way of the holding plates 63 to gradually move toward each other until the longitudinal or outer end faces of the jointing end portions 67 and 68 thereof are closely contacted with each other as seen in FIG. 15.

Finally, a cover plate 73 is placed onto the top faces of the jointing end portions 67 and 68 of the beams 65 and 66 as seen in FIG. 12, and screws 75 are inserted into perforations 74 formed in the cover plate 73 and are screwed tightly into the threaded holes 64 at the top end of the core plate 57 as seen in FIG. 12.

It is to be noted that a packing plate 76 made of a same material as the beams 65 and 66 may additionally be inserted into the working window hole 72 of each of the beams 65 and 66 to fill up the working window hole 72.

Consequently, the two beams 65 and 66 are jointed to each other in a linear condition by means of the metal connector as seen in FIG. 12.

Figure 16:
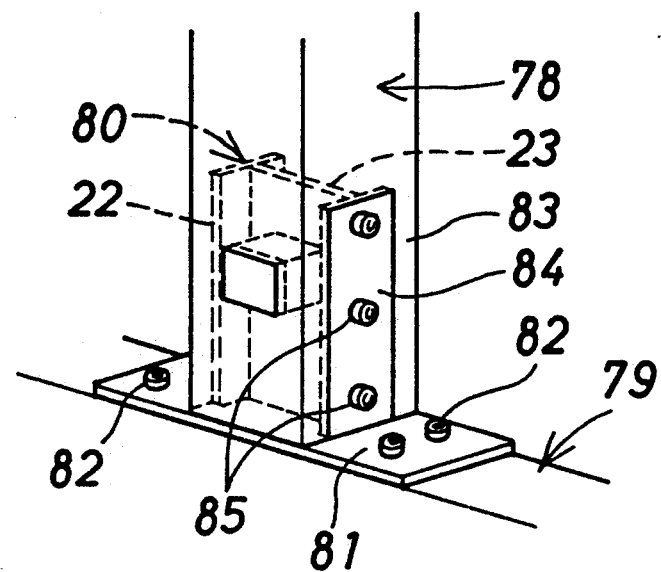
FIG. 16 is a perspective view of a metal connector and a jointing structure between a column and a sill using the metal connector showing a fourth preferred embodiment of the present invention.

Referring now to FIG. 16, there are shown a metal connector and a jointing structure between a column and a sill using the metal connector according to a fourth preferred embodiment of the present invention. The metal connector shown includes a metal connector body 80 which is similar in construction to the metal connector body 21 of the first embodiment and can be regarded as a modification to the metal connector body 21 wherein the mounting plate 24 of the metal connector body 21 is increased in size. In particular, while the mounting plate 24 of the metal connector body 21 has a width equal to the width of the bottom plate 22 and a height equal to the height of the core plate 23, the mounting plate 81 of the metal connector body 80 in the present embodiment has a width greater than the width of the bottom plate 22 and a height greater than the height of the core plate 23 such that it extends outwardly from the bottom plate 22 and core plate 23 as seen in FIG. 16.

The metal connector body 80 is secured, at the mounting plate 81 thereof, to an upper face of a sill 79 by means of a plurality of fastening bolts 82.

A column 78 to be jointed to the sill 79 by means of the metal connector has a fitting recess formed at a joining end portion 83, that is, a lower end portion thereof for receiving the metal connector body 80 in a similar manner as the fitting recess 38 of the beam 32 in the first embodiment described hereinabove. The metal connector body 80 is fitted in the fitting recess of the column 54, and a lower end face of the jointing end portion 83 of the column 78 is held in contact with the top face of the mounting plate 81 on the sill 79.

A cover plate 84 similar to the cover plate 43 of the metal connector in the first embodiment is fastened to the core plate 23 of the metal connector body 80 by means of a plurality of screws 85.

Figure 17:
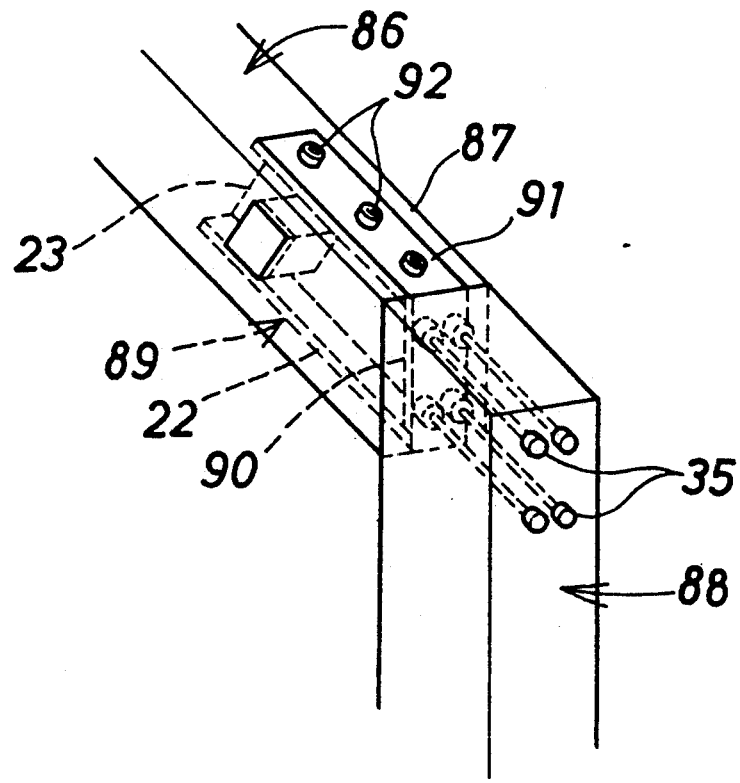
FIG. 17 is a perspective view of a metal connector and a jointing structure between an outer end of a diagonal member and an upper end of a column which form a principal rafter using the metal connector showing a fifth preferred embodiment of the present invention.

Referring now to FIG. 17, there are shown a metal connector and a jointing structure between a diagonal member and a column using the metal connector according to a fifth preferred embodiment of the present invention. In particular, the jointing structure joints an inner face at an upper end of a column 88 to a lower end face of a jointing end portion 87, that is, an outer end portion of one 86 of a pair of left and right diagonal members which form a principal rafter, that is, a truss triangle, together with a beam not shown.

The metal connector in the present embodiment includes a metal connector body 89 which is similar in construction to the metal connector body 21 of the metal connector of the first embodiment and can be regarded as a modification to the metal connector body 1 wherein the mounting plate 24 of the metal connector body 21 is inclined inwardly at a certain angle. In particular, while the mounting plate 24 of the metal connector body 21 in the first embodiment is erected uprightly at the right angle with respect to the bottom plate 22, a mounting plate 90 of the metal connector body 89 in the present embodiment is inclined to make an acute angle with respect to a bottom plate 91.

The metal connector body 89 is attached at the mounting plate 90 thereof to the inner face of the upper end of the column 88 in a similar manner as in the case of the metal connector body 21 in the first embodiment.

The diagonal member 86 has a fitting recess formed at the jointing end portion 87 thereof for receiving the metal connector body 89 in a similar manner as the fitting recess 38 in the first embodiment. The metal connector body 89 is thus fitted in the fitting recess of the diagonal member 86, and a lower end face of the jointing end portion 87 of the diagonal member 86 is held in contact with the inner face at the top end of the column 88.

A cover plate 91 similar to the cover plate 43 in the first embodiment is fastened to the core plate 23 of the metal connector body 89 by means of a plurality of screws 92.

Figure 18:
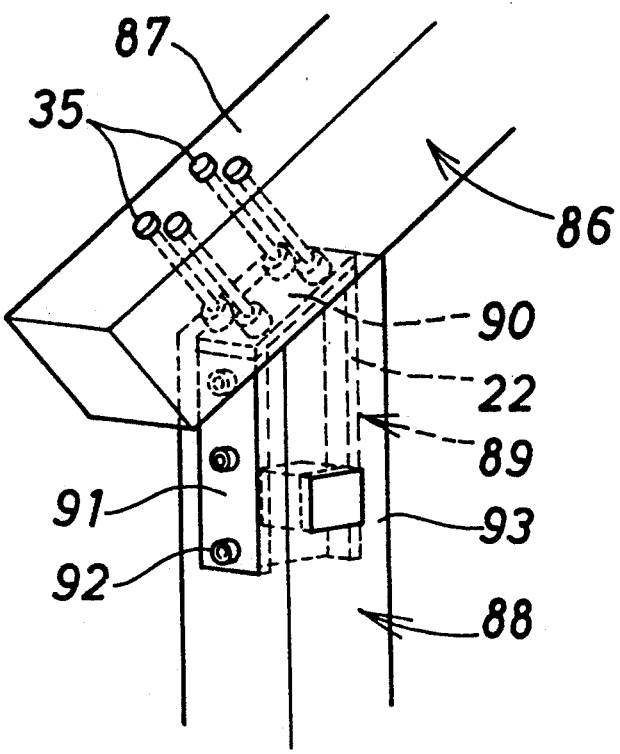
FIG. 18 is a perspective view showing a modification to the metal connector and the jointing structure of FIG. 17.

FIG. 18 shows another jointing structure between an upper end face of a column 88 and a lower side face of a jointing end portion 87, that is, an outer end portion, of a diagonal member 86 similar to the diagonal member 86 shown in FIG. 17.

Referring to FIG. 18, the jointing structure shown includes such metal connector body 89 as described above. The metal connector body 89 is secured to a lower side face of the jointing end portion 87 of the diagonal member 86. The column 88 has a fitting recess formed at a jointing end portion 87, that is, an upper end portion thereof, and the metal connector body 89 is fitted in the fitting recess of the column 88.

Roughly speaking, the jointing structure shown in FIG. 18 is different from the jointing structure shown in FIg. 17 in that the metal connector body 89 is mounted not on the diagonal member 87 but on the column 88 while the fitting recess for receiving the metal connector body 89 is formed not in the column 88 but in the diagonal member 86.

Figure 19:
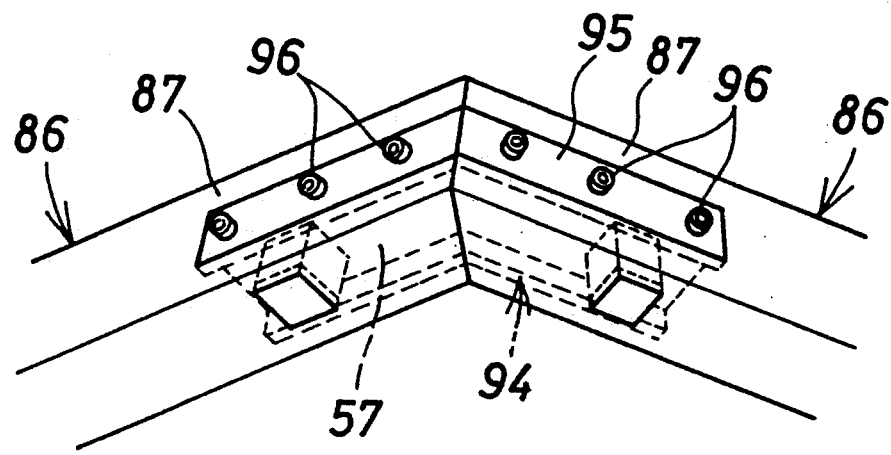
FIG. 19 is a perspective view of a metal connector and a jointing structure between top ends of a pair of left and right diagonal members which form a principal rafter using the metal connector showing a sixth preferred embodiment of the present invention.
Figure 20:
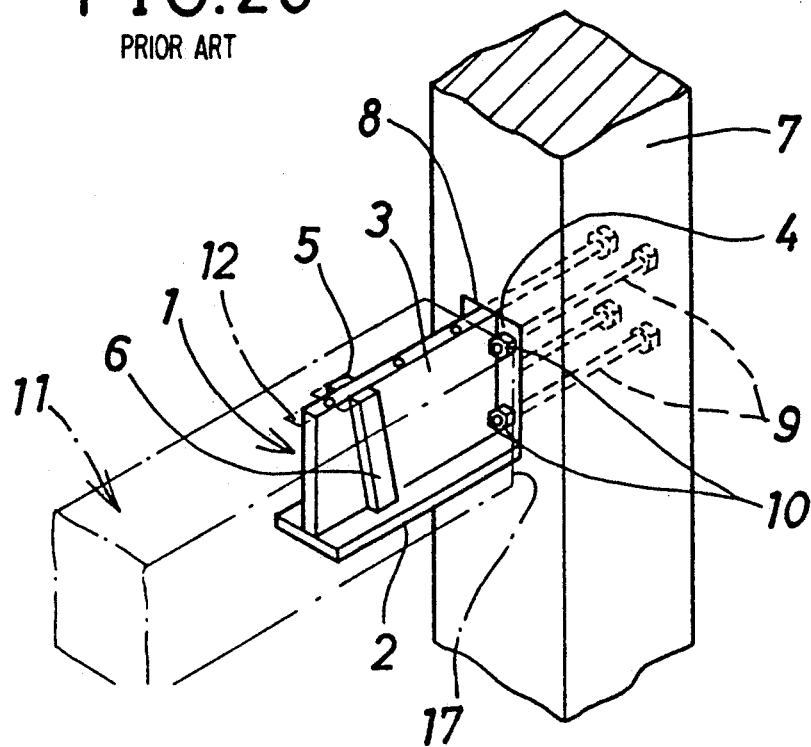
FIG. 20 is a perspective view showing a conventional metal connector and a conventional jointing structure between and a column and a beam using the metal connector.
Figure 21:
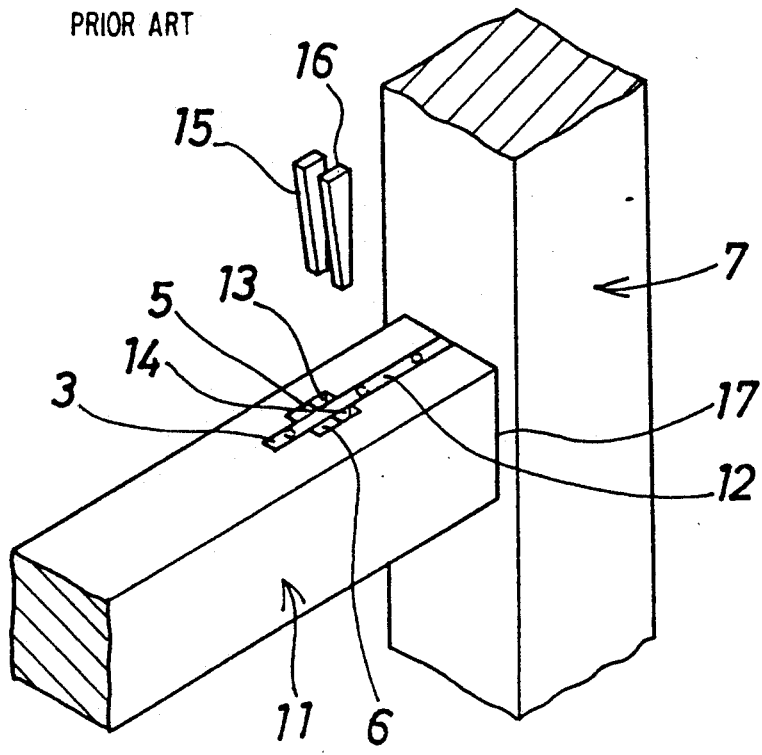
FIG. 21 is a perspective view of the metal connector and the jointing structure of FIG. 20 but at a stage immediately before the column and the beam are finally secured to each other by means of wedge members.

Referring now to FIG. 19, there are shown a metal connector and a jointing structure between a pair of diagonal members using the metal connector according to a sixth embodiment of the present invention. More particularly, the metal connector is used to joint top portions of a pair of left and right diagonal members 86 which form a principal rafter, that is, a truss triangle together with a beam.

The jointing structure is similar to the jointing structure between a pair of beams in a serial direction using the metal connector of the third embodiment shown in FIGS. 12 to 15. In particular, the jointing structure of the present embodiment is only different from the jointing structure in the third embodiment in that the metal connector of the present embodiment includes a metal connector body 94 which is bent in an inverted V-shape at an angle at which the diagonal members 86 are jointed to each other at jointing end portions 87 thereof, and also a cover plate 95 is bent similarly in an inverted V-shape and mounted on a bent upper end face of the core plate 57 of the metal connector body 94 by means of screws 96.

Having now fully described the invention, it will be apparent to one of ordinary skill in the art that many changes and modifications can be made thereto without departing from the spirit and scope of the invention as set forth herein.

What is claimed is:

1. A metal connector for jointing first and second members of a building to each other, comprising:
    a metal connector body including a bottom plate and a core plate secured vertically to an upper face of said bottom plate, said core plate having a window hole formed therein;
    a bolt, said bolt being secured at a base end portion thereof to an inner periphery of said core plate around said window hole such that the free end portion of said bolt extends into said window hole with a spacing left between the free end portion of said bolt and an opposing portion of the inner periphery of said window hole;
    said metal connector body being connected, at a longitudinal end thereof remote from said bolt, to said second member;
    said first member having a fitting recess formed at a jointing end portion thereof in a profile suitable to closely receive said bottom plate and said core plate of said metal connector body, said fitting recess being open to a bottom of said first member;
    said first member further having a working window hole formed contiguously to said fitting recess therein;
    a nut screwed on the free end portion of said bolt; and
    a holding plate inserted in said spacing between said nut and an opposing peripheral portion of said working window hole, and wherein said nut is turned in a predetermined direction to axially move on said bolt to push against said holding plate, said holding plate thus pushing against the opposing peripheral portion of said working window hole to force said first member to move toward said second member until a longitudinal end of said first member is closely contacted with said second member.

2. A metal connector as claimed in claim 1, further comprising a mounting plate secured to said core plate at the longitudinal end of said metal connector body remote from said bolt, and suitable numbers of fastening bolts and nuts for securing said mounting plate to said second member.

3. A metal connector as claimed in claim 2, wherein said mounting plate has a flange formed to extend laterally from an upper portion, or a lower portion or each of upper and lower portions, of an outer face thereof, said second member having a flange receiving recess or recesses formed therein for receiving the flange or flanges therein.

4. A metal connector as claimed in claim 2, wherein said mounting plate has a plurality of bolt head receiving tubes formed on an outer face thereof for receiving therein the heads of said bolts.

5. A metal connector as claimed in claim 1, further comprising a fitting member made of a same material as said first member and filled in said working window hole.

6. A metal connector as claimed in claim 1, further comprising a cover plate mounted on an outer face of said first member adjacent said jointing end of said first member and secured to an upper end face of said core plate of said metal connector body by means of a suitable number of screws.

7. A metal connector for jointing first and second members of a building to each other, comprising:
    a metal connector body including a bottom plate and a core plate secured vertically to an upper face of said bottom plate, said core plate having a pair of window holes formed at symmetrical locations adjacent opposite longitudinal ends of said core plate;
    a pair of bolts, said bolts being secured at base end portions thereof to inner peripheries of said core plate around said window holes such that the free end portions of said bolts extend into said window holes with spacings left between the free end portions of said bolts and opposing portions of the inner peripheries of said window holes;
    each of said first and second members having a fitting recess formed at jointing end portion thereof in a profile suitable to closely receive corresponding longitudinal halves of said bottom plate and said core plate of said metal connector body, said fitting recesses being open to a bottom of said first and said second members;
    each of said first and second members further having a working window hole formed contiguously with the fitting recess;
    a pair of nuts screwed on the free end portions of said bolts; and
    a pair of holding plates inserted in said spacings between said nuts and opposing peripheral portions of said working window holes, and wherein said nuts are turned in a predetermined direction to axially move on said bolts to push against said holding plates, said holding plates thus pushing against the opposing peripheral portions of said working window holes to force said first and said second members to move toward each other until longitudinal ends of said first and said second members are closely contacted with each other.

8. A metal connector as claimed in claim 7, wherein said metal connector body is bent in an inverted V-shape at the center thereof in the longitudinal direction of said core plate.

9. A metal connector as claimed in claim 7, further comprising a fitting member made of a same material as said first and second members and filled in each of said working window holes.

10. A metal connector as claimed in claim 7, further comprising a cover plate mounted on outer faces of said jointing end portions of said first and second members and secured to an upper end face of said core plate of said metal connector body by means of a suitable number of screws.

11. A jointing structure for a building, comprising:
    a metal connector body including a bottom plate and a core plate secured vertically to an upper face of said bottom plate, said core plate having a window hole formed therein;
    first and second members to be jointed to each other by means of said metal connector body;
    a bolt, said bolt being secured at a base end portion thereof to an inner periphery of said core plate around said window hole such that the free end portion of said bolt extends into said window hole with a spacing left between the free end portion of said bolt and an opposing portion of the inner periphery of said window hole;

means for connecting a longitudinal end of said metal connector body remote from said bolt to said second member;

said first member having a fitting recess formed at a jointing end portion thereof in a profile suitable to closely receive said bottom plate and said core plate of said metal connector body, said fitting recess being open to a bottom of said first member;

said first member further having a working window hole formed contiguously to said fitting recess therein;

a nut screwed on the free end portion of said bolt; and a holding plate inserted in said spacing between said nut and an opposing peripheral portion of said working window hole, and wherein said nut is turned in a predetermined direction to axially move on said bolt to push against said holding plate, said holding plate thus pushing against the opposing peripheral portion of said working window hole to force said first member to move toward said second member until a longitudinal end of said first member is closely contacted with said second member.

12. A jointing structure as claimed in claim 11, wherein said connecting means includes a mounting plate secured to the longitudinal end of said core plate of said metal connector body remote from said bolt, and suitable numbers of fastening bolts and nuts for securing said mounting plate to said second member.

13. A jointing structure as claimed in claim 11, further comprising a cover plate mounted on an outer face of said jointing end portion of said first member and secured to an upper end face of said core plate of said metal connector body by means of a suitable number of screws.

14. A jointing structure as claimed in claim 11, wherein said second member has a fitting recess and a working window hole formed at a jointing end portion thereof which are similar to said fitting recess and said working window hole of said first member, respectively, while said core plate of said metal connector body has a second window hole formed symmetrically to said window hole with respect to the center of said core plate, as measured in the longitudinal direction, and said connecting means includes a second bolt, a second nut and a second holding plate disposed on said metal connector body similarly to said bolt, said nut and said holding plate, respectively, for jointing said first and said second members such that longitudinal ends thereof are closely contacted with each other.

15. A jointing structure as claimed in claim 14, wherein said metal connector body is bent in an inverted V-shape at the center thereof, as measured in the longitudinal direction of said core plate.

16. A jointing structure as claimed in claim 14, further comprising a cover plate mounted on outer faces of said jointing end portions of said first and second members and secured to an upper end face of said core plate of said metal connector body by means of a suitable number of screws.

* * * * *